United States Patent Office 3,712,807
Patented Jan. 23, 1973

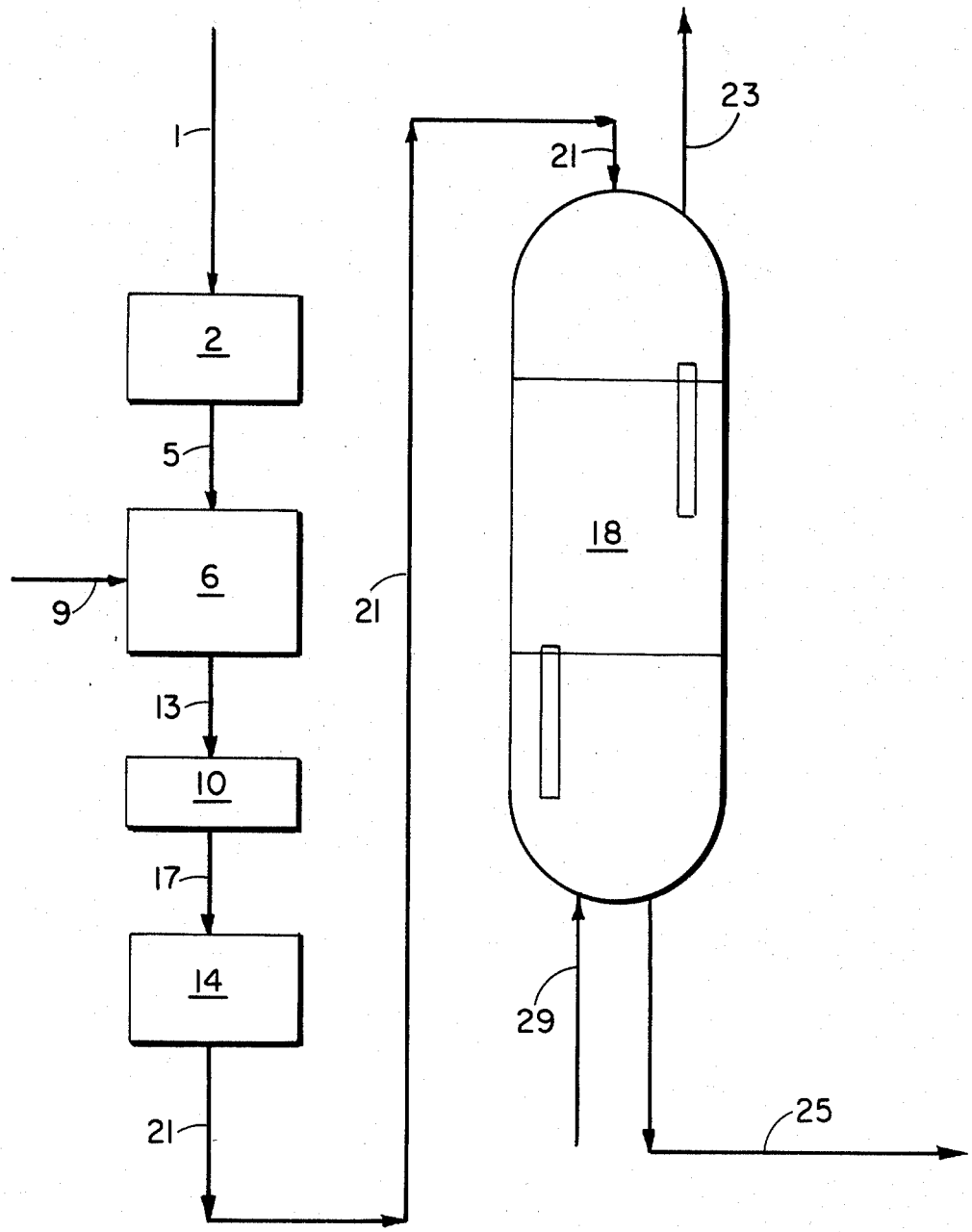

3,712,807
REDUCTION OF HIGH PURITY ORES COATED WITH CARBONIZED CARBOHYDRATES
William Volk, Princeton, N.J., assignor to Hydrocarbon Research, Inc., New York, N.Y.
Filed Sept. 4, 1970, Ser. No. 69,540
Int. Cl. C21b 1/00
U.S. Cl. 75—1                                                    6 Claims

ABSTRACT OF THE DISCLOSURE

High purity, fine, iron ore particles are first pretreated with a carbohydrate solution. The pretreated ore is then heated, before entering the reduction zone, to carbonize the carbohydrate material thereby leaving a coating of 0.25 to 1.0 percent carbon on the ore. This coating inhibits defluidization of the ore particles under the operating condition of the reduction zone.

BACKGROUND

In U.S. Pat. Nos. 2,995,426 and 3,227,546, it has been pointed out that iron ore can be effectively reduced by passing relatively pure hydrogen upwardly through a bed of ore at a gas velocity such as to fluidize the bed. Preferred operating conditions are set forth in such patents and they are usually characterized by temperatures in the range of about 700° F. to 1000° F. and pressures in the order of 200 to 600 p.s.i.g. Hydrogen purity is expressed in average molecular weight in the range of about 3 to 7.5 and provision is made for the control of the water vapor content of the recycle gas.

Considerable experience has been had with operations as set forth in the foregoing patents and commercial size units have been under continuous operation for extended periods of time. Furthermore, these operations have been carried out on various ores in the usual category of hematite and magnetite.

Recently, however, unexpected interference with smooth operations were noted when high purity ores were fed to the fluid bed reactor for reduction. When the non-iron or non-iron oxide content of the ore was less than 2 percent and particularly when it was less than one percent, the fluidization characteristics of the ore were very erratic. It was not possible to reduce these ores at temperatures in the 850° F. to 950° F. range.

On a further study of the different operating conditions which tended to develop this erratic fluidization, it was noted that they frequently, and almost invariably resulted when a high purity ore or mill scale was being reduced. As these are a commonly available supply of iron oxide and their reduction is thus of economic importance, considerable study was given to the problem of avoiding this defluidization and also to the problem of eliminating these conditions after they had started.

In U.S. Pat. No. 3,227,546 it was disclosed that carbon in the form of graphite, coal, coke and other substances containing a high percentage of carbon could be added to inhibit defluidization. This carbon was mixed with the ore fines. It has also been suggested that the ore be sprayed with oil which then is coked on the ore. Both of these methods have disadvantages. Mixing with carbon has the disadvantage in multiple bed units in that the carbon does not pass from the upper beds to the lower beds with the ore because of the extreme difference in density between the carbon and the ore.

Spraying with oil is not practical because only a small portion of the oil is converted to carbon at the temperature of reduction and the residual hydrocarbon enters the hydrogen stream and interferes with the usual method of operation.

SUMMARY

In this invention, it was discovered that when the iron ore to be reduced is of a high purity with less than 2 percent of the ore consisting of non-iron or non-iron oxide constituents, non-iron constituents are silica, alumina, and the usual oxides referred to in the steel industry as "acid insolubles," and the like, then under reduction conditions of 600 to 1000° F. and 200 to 500 p.s.i.g. defluidization was inhibited by first washing the iron ore particles in a solution containing a carbonaceous material.

The carbonaceous material formed a uniform layer coating on each particle. The particles were then dried so as to carbonize the carbonaceous material coating. Any iron ore agglomerates due to the crusting of the carbonaceous coating is then crushed so that it all passes through 16 mesh (USS) screen. The high purity, fine ore particles are then fed to a fluidized bed for reduction in the presence of a hydrogen atmosphere to provide a product of 90–98 percent pure iron.

Any carbon which remains in the iron can be subsequently removed in ways well known in the art, i.e., by addition of small amounts of iron ore in a melting operation, or by magnetic separation or air elutriation for iron powder production.

This invention is thus addressed to the reduction of metallic oxides by direct gaseous fluidized contact to render the process generally applicable to various ores and to maintain uniform operating conditions.

This invention relates to improvements in the reduction of metallic oxides and more specifically to an improved process of reducing high purity iron oxide by the direct reduction at temperatures less than fusion with a reducing gas such as hydrogen.

A further object of this invention is to provide an improved process for the direct reduction of mill scale and high grade fine iron ores of high purity with hydrogen in a fluidized bed at super-atmospheric pressure and temperatures below fusion.

A more specific object of this invention is to add carbon to the feed material such as mill scale, hematite or magnetite ore to eliminate, suppress and minimize stickiness of this powder when reduced at temperatures in the range of 600–1000° F.

Further objects and advantages of this invention will appear from the following description of a preferred form of embodiment thereof.

DESCRIPTION OF THE DRAWING

The drawing is a diagrammatical representation of the process for reducing high purity, fine metal ores.

DESCRIPTION OF PREFERRED EMBODIMENT

High purity iron ore or mill scale, hereinafter called the ore, enters in line 1 and passes to grinding zone 2. The ore is ground such that it all passes through at least a 16 mesh (USS) screen with about all of it remaining on a screen with 10 micron holes. The ground ore then passes in line 5 to mixing zone 6. A solution of carbonaceous material, preferably a water solution of a carbohydrate but most preferably soluble starch, such as corn, tapioca, potato and arrowroot or sugar, such as lactose, maltose, sucrose and glucose is added to 6 through line 9 so that about 0.5 to about 2.0 percent of the carbonaceous material remains on the ore after drying. The ore and carbonaceous solution are well mixed in 6 and then the ore is filtered from the solution and passes in 13 to drying zone 10. As an alternative the ore and solution can be passed to the drying zone without any filtering. The ore, while being kept in motion, is dried in 10 and then heated to between about 350 and about 500° F.

thereby carbonizing the carbonaceous material. The ore is now coated with about 0.25 to about 1.0 percent carbon. The ore then passes in line 17 to be crushed at 14 so that it at least all passes through a 16 mesh screen. The fine ore then passes in line 21 to reduction zone 18. The ore is kept fluidized in 18 by the upward flow of hydrogen in 29. The reduction zone 18 is a multi-bed zone and is maintained at a temperature between about 600 and 1000° F. preferably 800 to 900° F. and at a pressure between about 200 and 500 p.s.i.g. but preferably 300 to 400 p.s.i.g. The spent gases leave in 23 while an iron of 90 to 98 percent metallization is recovered in 25, i.e. 90 to 98 percent of the iron in the product is present as iron metal and only 2 to 10 percent of the iron is present as iron oxide.

Example I

Soluble laboratory starch is dissolved in hot water in sufficient quantity to give 1 percent starch on the ore. Fine ore with 70 percent Fe and 29 percent $O_2$ is mixed with the solution. 219 pounds of the starch covered particulate ore, all passing through a 16 mesh screen, is placed in a reaction zone and reduced at 800° F., 350 p.s.i.g. at a linear velocity of about 1.2 feet per second for 5 hours in a hydrogen atmosphere. A 97 percent reduction is obtained without having the ore bed defluidize.

Example II

Magnetic separation of the product from the reduction of the ore cited in Example I which has a 0.5 percent carbon coating, results in a magnetic fraction containing less than 0.2 percent carbon.

Example III

The same ore cited in Example I is treated similarly except that a sugar solution is employed and a carbon coating of 0.54 percent is deposited on the ore. Reduction is carried out at 850° F. without defluidization.

Example IV

The same ore cited in Example I, is processed without the carbonaceous coating and defluidizes when the reduction temperature reaches 750° F.

From these results, it is to be understood that the pretreatment of a fine, high purity ore with a water soluble carbohydrate solution inhibits defluidization of the ore bed under the reducing conditions.

Having thus described the invention with reference to specific examples thereof, it is to be understood that other modifications, alterations and applications will become apparent to those skilled in the art without departing from the scope of the present invention. The present invention is limited as defined in the claims appended hereto. This invention will, of course, have application to a wide range of known reduction processes and therefore this description should not be construed as unduly limiting the scope thereof.

I claim:
1. In a fluidized hydrogenation process for the reduction of an iron ore wherein the ore is of high purity having less than 2.0 percent non-metallic and non-metallic oxide constituents, and the ore particles have a size distribution between 16 mesh and 10 microns, the improvement in combination therewith which comprises:
   (a) passing the particulate ore to a mixing zone;
   (b) mixing the ore with a carbonaceous solution comprising water and water soluble carbohydrates;
   (c) drying the ore-solution mixture and vaporizing the water to form a uniform coating of about 0.5 to 2.0 percent of the carbonaceous material on the ore particles;
   (d) carbonizing the coating on the particulate ore to form a coating of 0.25 to 1.0 percent carbon;
   (e) crushing the coated particles so that said particles all pass 16 mesh to 10 microns;
   (f) passing the ore to a fluidized reducing zone maintained at a temperature between 600 and 1000° F. and at a pressure between 200 and 500 p.s.i.g.;
   (g) reducing the ore with an upflowing hydrogen containing gas passing through the bed at a linear velocity to keep the ore in a fluidized state;
   (h) the time of reaction being sufficient to reduce the ore to at least 90% metal; and,
   (i) removing said metal as a fluidizable product.

2. The process of claim 1 wherein the reducing zone is operated at a temperature between 800 and 900° F. and at a pressure between 300 and 400 p.s.i.g.

3. The process of claim 1 wherein the carbonizing takes place between 350 and 500° F.

4. The process of claim 1 wherein an iron in excess of 97 percent metallization is recovered from the reduction zone.

5. The process of claim 1 wherein the water soluble carbohydrate in step (b) is a starch.

6. The process of claim 1 wherein the water soluble carbohydrate in step (b) is a sugar.

References Cited

UNITED STATES PATENTS

| | | | |
|---|---|---|---|
| 3,227,546 | 1/1966 | Johnson et al. | 75—26 |
| 2,758,021 | 8/1956 | Drapeau, Jr. et al. | 75—26 X |
| 3,413,152 | 11/1968 | Folkins et al. | 136—122 X |
| 3,079,266 | 2/1963 | Galy | 252—421 X |
| 3,062,639 | 11/1962 | Sterling | 75—26 |
| 711,738 | 10/1902 | Ruthenburg | 75—11 |
| 2,900,246 | 8/1959 | Keith et al. | 75—26 |

WINSTON A. DOUGLAS, Primary Examiner

M. J. ANDREWS, Assistant Examiner

U.S. Cl. X.R.

75—26, 34